INVENTOR.
GEORGE L. RADAMAKER
BY Williams, David,
Hoffmann & Yount
ATTORNEYS

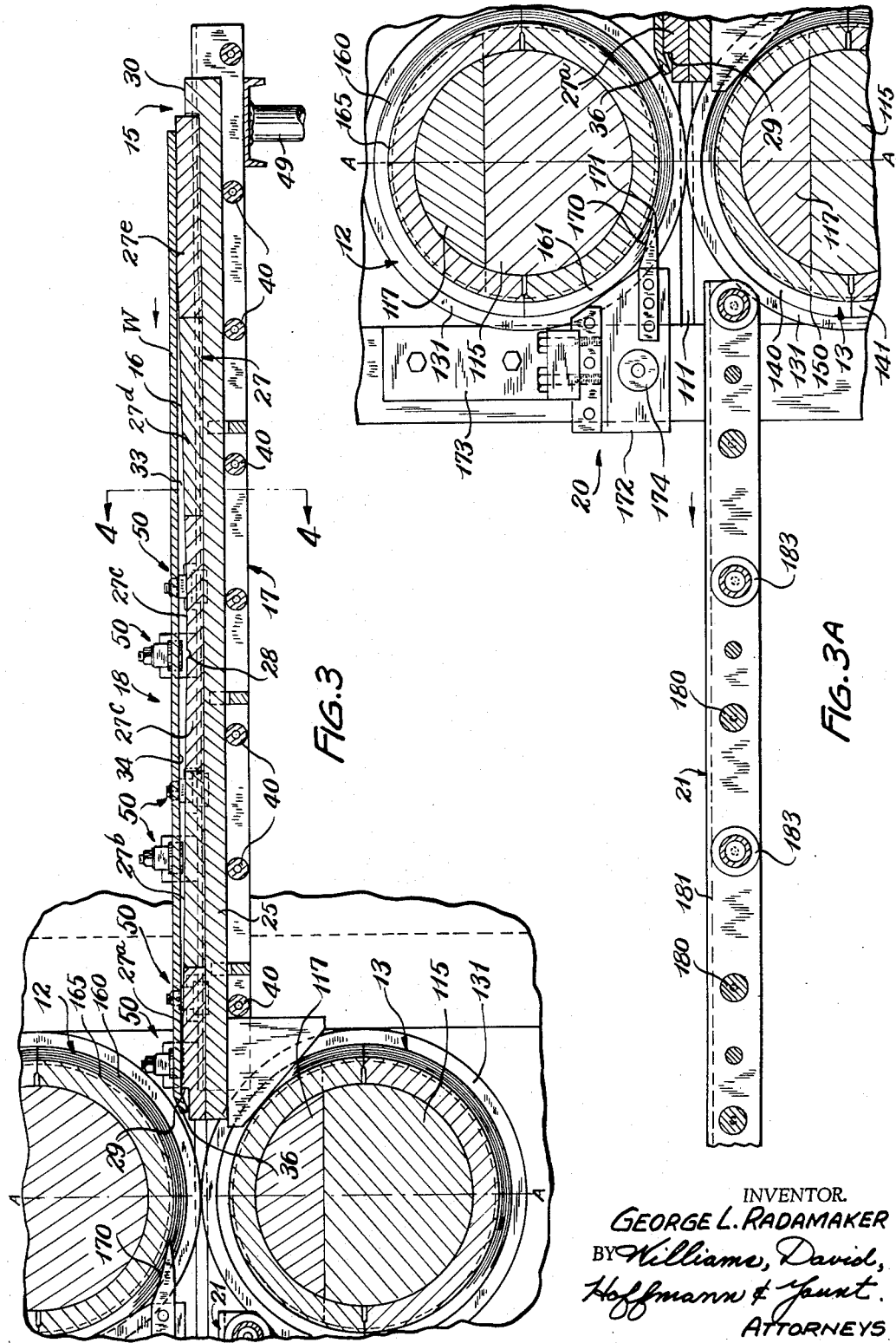

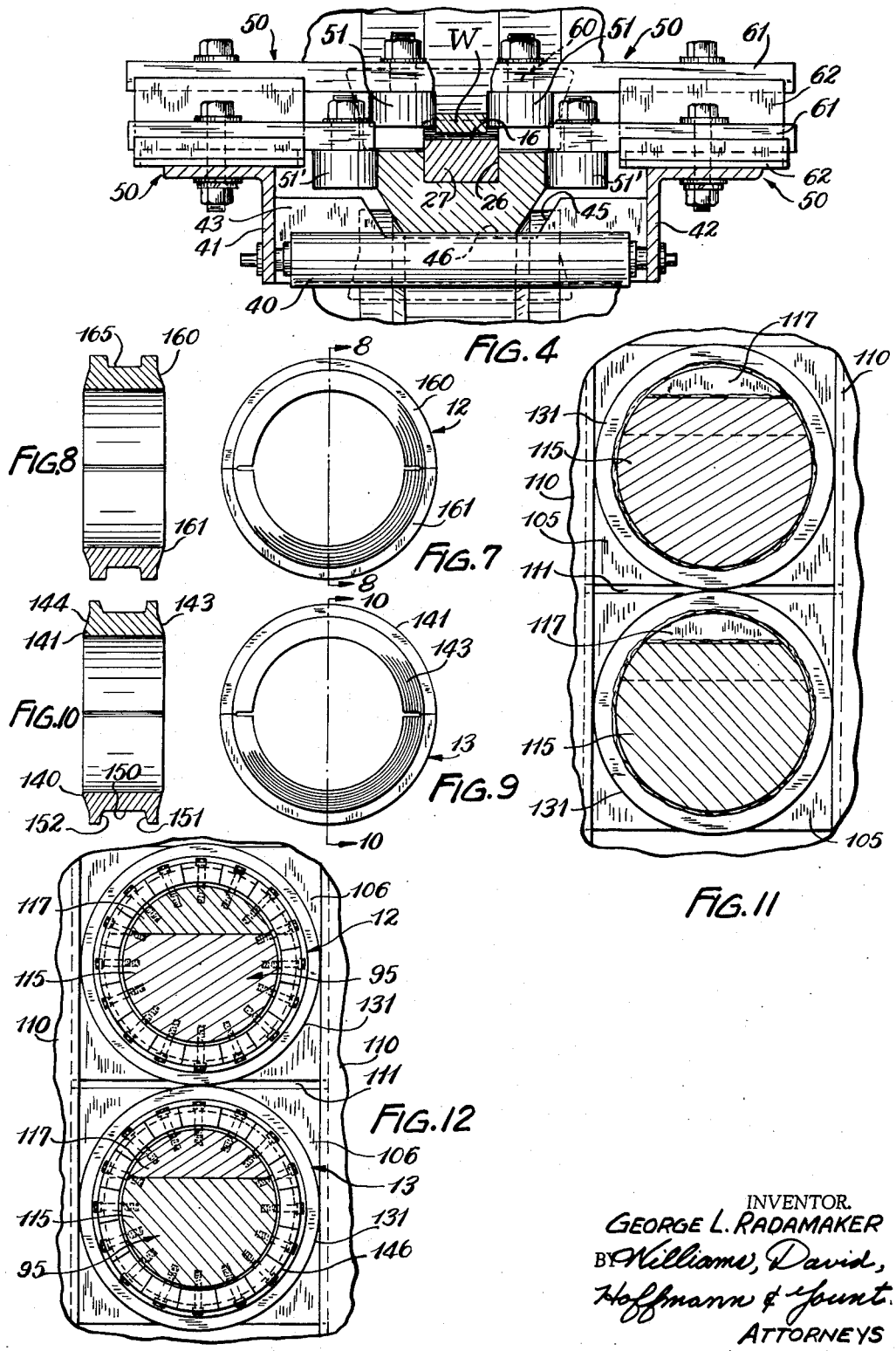

United States Patent Office 3,197,991
Patented Aug. 3, 1965

3,197,991
APPARATUS AND METHOD FOR TAPERING BARS
George L. Radamaker, Detroit, Mich., assignor to Eaton Manufacturing Company, Cleveland, Ohio, a corporation of Ohio
Filed July 30, 1962, Ser. No. 213,247
8 Claims. (Cl. 72—198)

The present invention relates to a method and apparatus for shaping a metal article, and more particularly, to a novel method and apparatus for forming a tapered leaf spring from suitable bar stock and wherein an assembly, comprising a carrier means having a die surface supporting the bar stock, is moved between a pair of pressure rolls for causing the bar stock to be shaped against the die surface. The bar stock used in the method and apparatus of this invention is preferably in a heated condition.

The principal object of the present invention is the provision of a simple and reliable method and apparatus for forming a tapered bar, as noted above, wherein a desired smooth and uniformly tapered surface is achieved on the bar, and by which such tapered bars can be produced rapidly and economically.

Another object of the present invention is the provision of a new and improved method and apparatus, as noted in the next preceding paragraph, for efficiently and effectively forming a tapered bar having a uniform width and a variable thickness and which preferably tapers from a thick central portion toward its opposite ends with what can be conveniently termed a double taper.

A further object of the present invention is the provision of a new and improved apparatus for tapering bar stock including a pair of spaced rolls between which bar stock and a carrier having a die surface thereon supporting the bar stock move and one of the rolls engages one surface of the bar stock while the other engages a surface of the carrier to cause one surface of the bar stock to take the shape of the die surface, and the rolls are constructed, associated and driven so as to minimize wear thereof and produce a desired smooth tapered surface finish on the bar.

A further object of the present invention is the provision of a new and improved apparatus for tapering a workpiece including a pair of rolls effective to taper the workpiece as it moves therebetween and wherein each roll is constructed of discrete arcuate roll segments readily secured to and detachable from a rounded roll shaft to provide for easy maintenance and setup of the apparatus in a minimum of time.

A further object of the present invention is the provision of a new and improved rolling apparatus, as noted in the next preceding paragraph, wherein each roll shaft has a dovetail slot therein extending transverse to the axis thereof and providing an opening for an insert segment to be secured therein which insert segment completely fills the slot and provides a uniformly rounded shaft.

A further object of the present invention is the provision of a new and improved rolling apparatus for tapering workpieces including a pair of spaced rolls between which the workpiece and a carrier having a die surface thereon supporting the workpiece move and one of the rolls engages one surface of the workpiece while the other engages a surface of the carrier, and the rolls are constructed and associated to cause one surface of the workpiece to assume the shape of the die surface, and the rolls are geared together and driven in unison to avoid relative longitudinal displacement between the workpiece and die surface and to minimize wear while achieving a desired smoothly tapered surface on the workpiece.

Still another object of the present invention is the provision of a new and improved simple and efficient rolling apparatus including a pair of vertically spaced rolls mounted on roll shafts and between which the workpiece and carrier move and wherein the shafts of the rolls have cooperating spacer rings in running engagement at axially spaced locations for supporting the upper roll and maintaining proper roll spacing and for preventing tilting of the rolls or cocking of the workpiece or carrier.

Further objects and advantages of the present invention will be apparent to those skilled in the art to which it relates from the following detailed description thereof made with reference to the accompanying drawings, in which:

FIGS. 3 and 3A are partial vertical sectional views of the apparatus of FIG. 2 taken approximately along the section line 3–3A—3–3A of FIG. 2 and form a complete sectional view of the apparatus of FIG. 2 when the views are connected at lines A—A thereof;

FIG. 4 is a vertical sectional view of the apparatus shown in FIG. 3 taken approximately on the section line 4—4 of FIG. 3;

FIG. 5 is a side elevational view of a length of bar stock which comprises a workpiece to be formed by the apparatus illustrated in FIG. 1;

FIG. 6 is a side elevational view of a tapered leaf spring formed from the bar stock shown in FIG. 5;

FIG. 7 is an end elevational view of the roll segments forming the uppermost roll illustrated in FIG. 2;

FIG. 8 is a vertical sectional view taken approximately on the line 8—8 of FIG. 7;

FIG. 9 is an end elevational view of the roll segments forming the lower roll illustrated in FIG. 2;

FIG. 10 is a vertical sectional view taken approximately along the section line 10—10 of FIG. 9;

FIG. 11 is a vertical sectional view of the apparatus of FIG. 2 taken approximately on the section line 11—11 of FIG. 2; and FIG. 12 is a vertical sectional view of the apparatus of FIG. 2 taken approximately on the section line 12—12 of FIG. 2.

Figure 1:
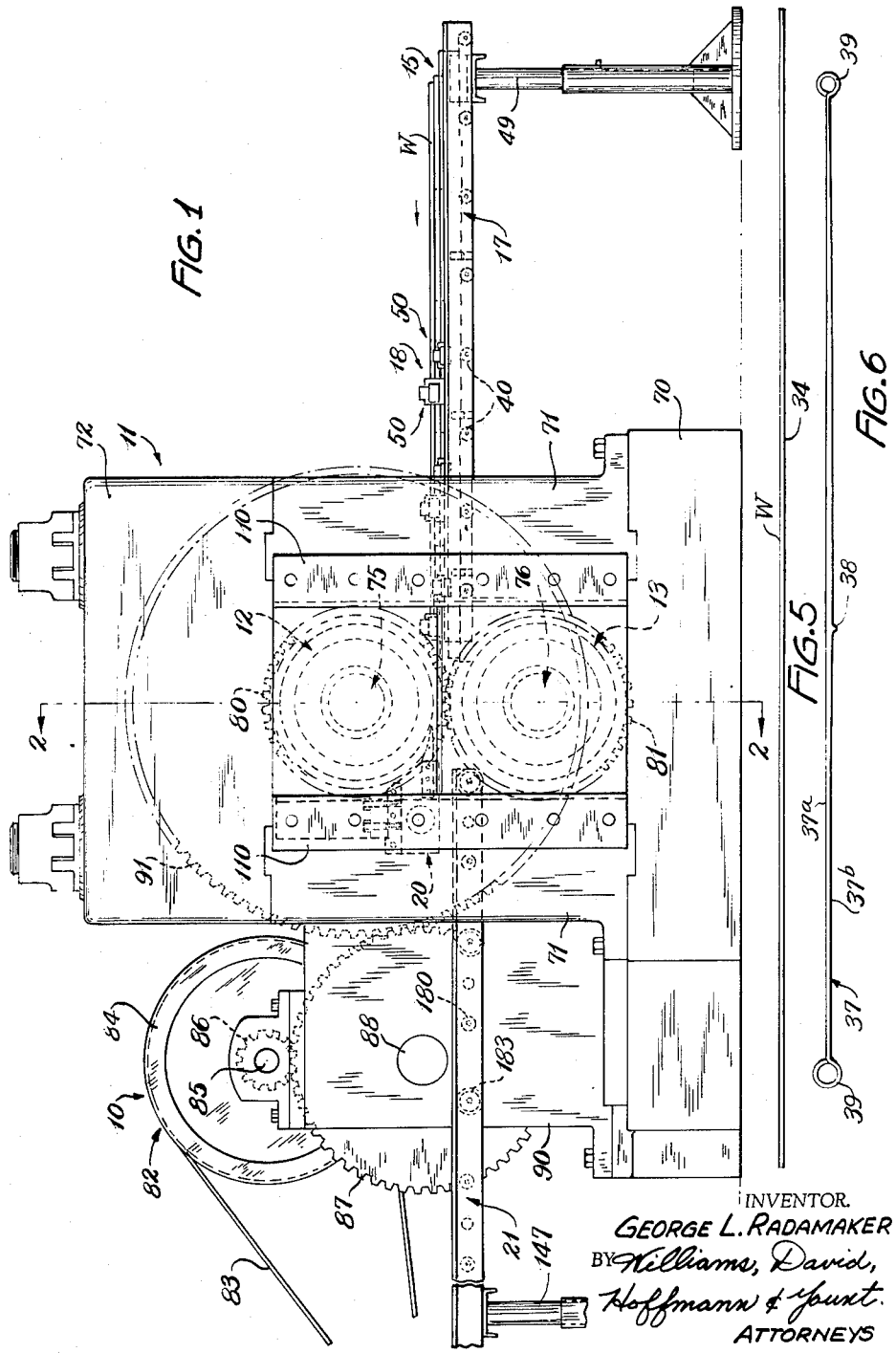
FIG. 1 is a side elevational view of a rolling apparatus embodying the present invention.

The present invention is illustrated in the drawings, by way of example, as embodied in a rolling apparatus 10 for shaping a length of leaf spring bar stock W, preferably heated stock, into a tapered leaf spring having its greatest thickness at its midpoint and which tapers from its midpoint to its opposite ends and is of uniform width throughout. The bar W is of rectangular cross section and has a substantially uniform width and thickness.

The bar W is tapered by a rolling mechanism 11 which includes a pair of vertically spaced forming rolls 12, 13 between which the bar is moved. The bar is moved between rolls 12, 13 on a carrier assembly 15 including a die surface 16, on which the bar is supported. A feeding conveyor 17 feeds the carrier assembly 15 with the bar W thereon through a suitable aligning mechanism 18 and then into the bite of the rolls 12, 13. The upper roll or die roll 12 drivingly engages the top surface of the bar while the lower roll or platen roll 13 drivingly engages the under surface of the carrier assembly and these driving engagements cooperate to advance the bar and carrier assembly 15 therebetween. As the bar moves between the rollers it is pressed downwardly and the lower surface thereof is formed into conformity with the shape of die surface 16 by the rolls 12, 13 cooperating with the carrier assembly 15 and die surface 16. As the leading end of the bar moves beyond the rolls 12, 13 it engages a suitable stripper mechanism 20 for stripping the bar from the surface of the die roller 12 and insuring that the bar moves with the carrier assembly 15 beyond the rolls 12, 13 onto the exit conveyor 21.

The carrier assembly 15 on which the bar W is supported while being moved between rolls 12, 13 comprises a platen 25 having a generally U-shaped cross section including a longitudinally extending die recess 26 opening upwardly, as viewed in the drawings. A plurality of die segments or die bars 27 are snugly positioned in the die recess 26 in abutting relation and the uppermost surfaces thereof form the die surface 16. The die segments 27 are suitably tapered and are arranged to provide the desired taper on the bar W supported thereby and may be arranged or profiled to form the bar so that it has any desired thickness at any section throughout its length.

The die segments 27, as illustrated in FIG. 3, include die segments 27a, 27b and 27d, 27e tapering toward the center of the platen 25, from the left and right ends thereof, respectively. A centrally located die segment 27c is tapered from its opposite ends toward its mid-point and is provided at its mid-point with a small recess 28 for purposes to be described hereinafter. The die member 27a adjacent the roll mechanism 11 is provided with a notch 29 for a purpose to be described hereinbelow. The various tapered top surfaces of the die segments provide the smoothly inclined die surface 16, as aforementioned, which tapers from its opposite ends toward the center of the platen 25. The trailing portion of the platen 25 is provided with a vertical projection 30 which functions as a stop member for engaging the trailing end of die segment 27e to assist in preventing the die segments 27 from sliding in the die recess 26 relative to the platen 25.

The bar W which comprises a length of leaf spring bar stock is heated and is positioned on and supported by the die surface 16. Since the surface 16 is inclined or slants downwardly and towards the middle of the platen 25 from the opposite ends thereof, the bar W is effectively supported at its opposite ends with a gap 33 between the undersurface 34 of the bar and the die surface 16, which gap progressively increases in width from the opposite ends thereof toward the center of the die segments 27.

The die segments 27 and bar W after being associated as described above are moved into the bite of rollers 12, 13 by conveyor 17. The platen roller 13 drivingly engages the under surface of the platen 25 while the die roller 12 drivingly engages the top surface of the bar and presses the bar down so that the under surface 34 thereof is shaped into conformity with the shape of surface 16 provided by the die segments. When the rollers 12, 13 engage the leading end 36 of the bar W and the platen 25 respectively, the leading end 36 of the bar is bent downwardly into the notch 29 in the die segment 27a. This bent portion of the bar functions to hold the bar in position on the die segments and prevents the bar W from bodily sliding relative to the die segments 27 but, of course, permits the bar to be shaped and be lengthened when shaped. After the leading edge 36 of the bar is bent downwardly as shown in FIG. 3, the rolls 12, 13 effectively force the workpiece downwardly as it moves therebetween so that it conforms to the shape of surface 16.

The finished tapered bar comprises a leaf spring 37 for use in vehicles and is illustrated inn FIG. 6 as having a smooth, flat upper surface 37a formed by engagement with die roller 12 and a lower surface 37b tapered from a thick central portion having an embossment 38 formed by recess 28 in die segment 27c to the opposite ends thereof. An eyelet 39 is formed on each end of the spring after rolling, and the eyelets 39 and embossment 38 function in mounting the leaf springs 37 on the vehicle.

The feeding conveyor 17 which conveys the carrier assembly 15 with the bar W positioned thereon into the roll mechanism 11 comprises a plurality of rollers 40 extending transverse to the direction of movement of the bar and some of which are driven by a suitable drive mechanism, not shown. The opposite ends of rollers 40 are rotatably supported by suitable elongated frame members 41 and 42. A plurality of frame support members 43 extend between the side frame members 41, 42 and each is provided with a recessed portion 45, the bottom surface 46 of which extends below the peripheral surface of the rollers 40. The width of the recess 45 is sufficient to accommodate passage of the platen 25 therethrough. The end of the conveyor 17 remote from the rolling assembly 11 is supported by a vertically extending adjustable post 49 of conventional construction. The end of the conveyor 17 adjacent the roll mechanism 11 is suitably supported thereby.

As aforementioned, the conveyor 17 feeds the carrier assembly 15 with the bar thereon through the aligning mechanism 18, which functions to align the workpiece W and platen 25 so that they will be properly engaged by rolls 12, 13, respectively. The aligning mechanism 18 comprises a plurality of aligning roller mechanisms 50 spaced along the path of movement of the carrier assembly 15 on each side of conveyor 17. FIG. 3 of the drawings shows that there are six aligning roll mechanisms 50 on each side of the conveyor 17. Of course, any number of aligning mechanisms 50 may be used, depending upon the aligning requirements and the length of the bar W. Three of the six aligning roll mechanisms 50 shown on each side of conveyor 17 include rollers 51 which engage the opposite vertical edges of the workpiece W as it moves with the carrier assembly. The other three aligning mechanisms 50 on each side of the conveyor 16 are provided with rollers 51' which engage opposite vertically extending surface portions of the platen 25. All of the aligning mechanisms 50 are identical in construction and therefore only one will be described in detail, it being understood that the other aligning mechanisms 50 are substantially identical with the aligning mechanism described and corresponding parts of each of the aligning mechanisms will be designated with corresponding reference numerals.

Each of roll aligning mechanisms 50 comprises a roller 51 or 51', as aforementioned, rotatably mounted on a vertically extending shaft 60 which is supported at one end of a horizontally extending bar 61. The bar 61 is positioned in a slot in a support arm holder 62. The support arm holder 62 is suitably secured to one of the frame members 41, 42, depending upon which side of the conveyor 17 the mechanism 50 is mounted. The arm 61 and arm holder 62 are arranged so that the arm 61 can be moved relative to arm holder 62 in a direction transverse to the path of movement of the platen 25 to thereby provide for adjustment so that the aligning mechanisms 50 may function to align platens and bars of varying widths.

The rolling mechanism 11 into which the bar W supported by the carrier assembly 15 is moved comprises a substantially rectangular shaped base member 70 having a plurality of vertically extending frame members 71, one of which extends from each corner of the base member 70. An upper frame member 72 is supported by the vertically extending members 71. The rollers 12 and 13 are positioned in the space between the vertically extending side frame members 71 and have an axis of rotation which extends parallel to rollers 40 of conveyor 17 and transverse to the direction of movement of the bar W.

Figure 2:
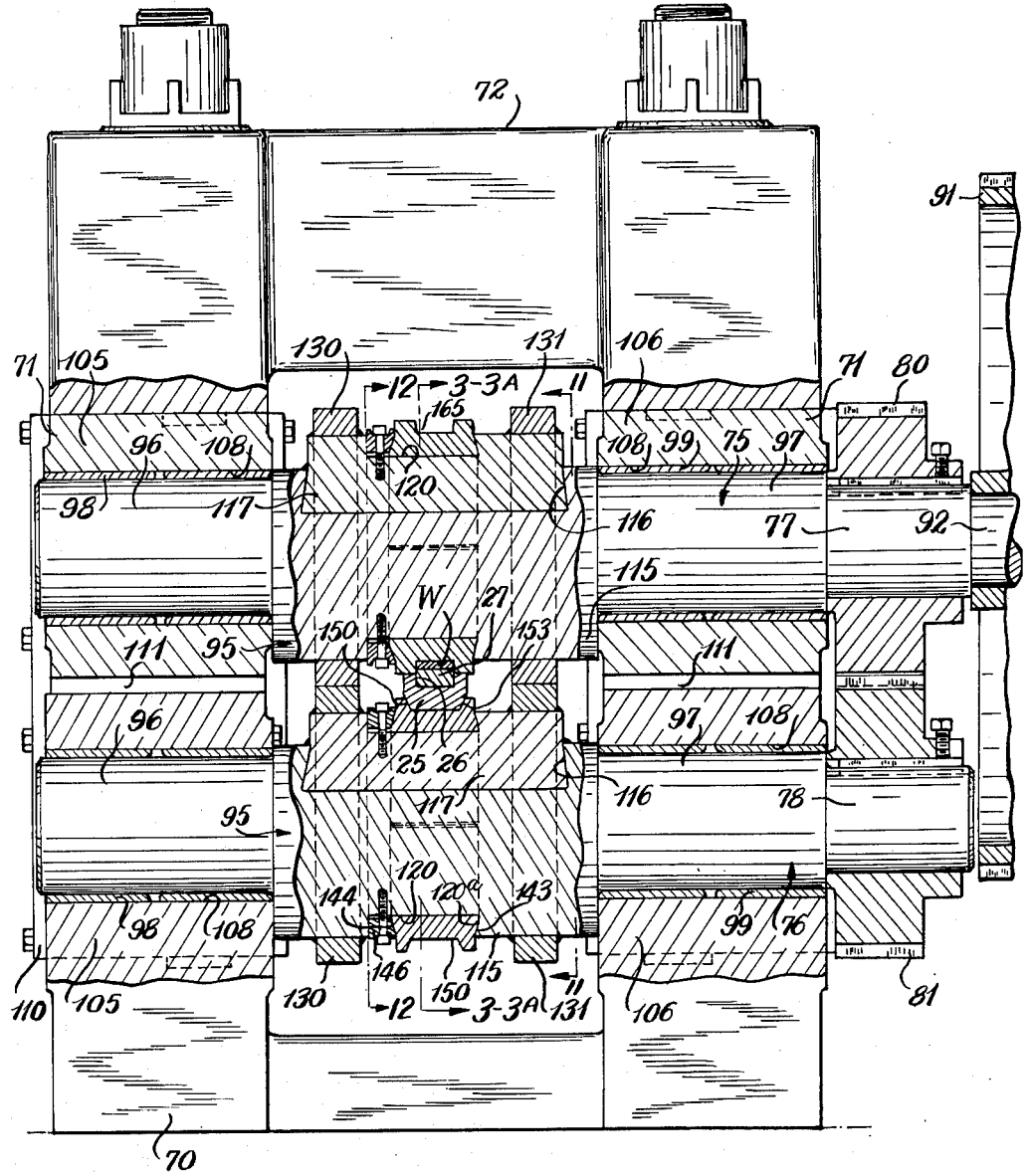
FIG. 2 is a vertical sectional view partly in elevation taken approximately on the section line 2—2 of FIG. 1.

The rollers 12 and 13 are mounted on vertically spaced horizontally extending shaft members 75, 76, respectively, having driving stud shaft portions 77, 78, respectively, extending from the right end thereof as viewed in FIG. 2. Driving gears 80, 81 are fixedly mounted on the stud shaft portions 77, 78, respectively, and intermesh. The gears 80, 81 have the same diameter and number of teeth, and thus rotate at the same speed, causing the shafts 75, 76 to be rotated at the same speed.

The drive mechanism for driving the gears 80, 81 may be of any form and a suitable drive 82 therefor is shown by way of example in FIG. 1. The drive 82 comprises a suitable power source, not shown, for driving a belt 83 which is trained around a conventional flywheel 84 mounted on shaft 85. A pinion gear 86 is also mounted on shaft 85 and meshes with a gear 87 mounted on shaft 88 which is suitably journaled in a frame portion 90 of the rolling assembly 11. The gear 87 meshes with a bull gear 91 which is fixedly mounted on a projecting shaft portion 92, shown in FIG. 2, extending outwardly from the stud shaft portion 77 of shaft 75. It should be apparent that rotation of the bull gear 91 causes rotation of the gears 80, 81 and resultant rotation of shafts 75, 76, respectively. Since the gears 80, 81 are intermeshed the peripheral speed of the rollers 12 and 13, respectively, will be identical at their points of contact with the bar W and platen 25, respectively. This minimizes wear of the roll surfaces of the rolls 12 and 13 and provides a smooth surface finish on the tapered workpiece and avoids longitudinal relative displacement between the bar and die surface.

The shafts 75, 76 on which rolls 12, 13, respectively, are mounted are of identical construction and similar reference numerals are used to designate corresponding parts of each shaft. Each of the shafts 75, 76 has a rounded enlarged central portion 95 located between a pair of bearing support shaft portions 96, 97. The bearing shaft support portions 96 and 97 on the opposite sides of the central portion 95 have suitable bearing means 98, 99, respectively, encircling them and the bearing means 98, 99 are supported in turn by bearing support members 105, 106, respectively. The undersurface of bearing support members 105, 106 for the shaft 76 rest on base member 70 of the roll mechanism 11 while the top surface of the bearing supoprt members 105, 106 for shaft 75 engage the undersurface of frame member 72. Each of bearing support members 105, 106 are substantially rectangular in cross section and have an opening 108 therethrough in which the bearings 98, 99, respectively, are positioned. The opposite vertically extending edges of each of the bearing support members 105, 106 are overlapped by vertically extending gib members 110 secured to the frame members 71 and which prevent movement thereof axially of the shafts.

The bearing support members 106 for the shaft members 75, 76 are provided with a small amount of clearance 111 therebetween. The bearing support members 105 for the shaft members 75, 76 are likewise provided with clearance 111 therebetween, as will be described more in detail hereinbelow.

The central portion 95 of each of the shafts 75, 76 comprises a main shaft segment 115 having a dovetail slot 116 therein extending transverse to the axis of the shaft. A rounded shaft segment 117 is welded in the dovetail slot 116 and provides a uniformly rounded central shaft portion. A roll receiving groove 120 is provided in the central portion 95 of each of the shafts 75, 76 and extends circumferentially therearound. The rolls 12, 13 are secured in the roll receiving grooves in a manner to be described hereinbelow.

Spacer means in the form of rings 130, 131 welded in encircling relation around the periphery of the enlarged portion 95 of each shaft 75, 76 provides and maintains the aforementioned clearances 111. The rings 130, 131 project beyond the outer periphery of the rolls 12, 13, respectively, and the rings 130, 131 on shaft 75 engage and rotate in engagement with the spacer rings 130, 131, respectively, on shaft 76. The spacer rings 130, 131 of the lower roller support the weight of the upper shaft 75 and roller 12 and prevent tilting thereof while the force tending to separate the rolls 12, 13 when the bar W is fed therebetween is resisted by the bearing support members 105, 106. The bearing support members 105, 106 for shaft 75 bear against the under surface of upper frame member 72 while the bearing support members 105, 106 for shaft 76 bear against the upper surface of frame member 70, as aforementioned, and thereby transmit the forces applied thereto through spacer rings 130, 131 to these frame members.

The lower or die roller 13 comprises a pair of semicircular roll segments 140, 141 which are suitably positioned in the aforementioned roll receiving groove 120 in the enlarged portion 95 of shaft 76. The roll segments 140 and 141 have a suitably inclined side surface 143 which is adapted to engage the undercut edge 120a of groove 120. The side surface of the roll segments 140, 141 opposite the side surface 143 is provided with an inclined surface 144 which is engaged by a corresponding surface on a retaining means which secures the roll segments in the roll receiving groove 120. The retaining means comprises a plurality of retaining blocks 146 suitably secured around the periphery of the enlarged portion 95 of shaft 76 in groove 120 and these blocks 146 engage and secure the roll segments 140, 141 in position in the groove 120.

The cross section of the roll segments 140, 141, as shown in FIG. 10, includes a circumferential platen groove 150 having inclined surface portions 151, 152 diverging outwardly from the periphery of the roll segments. As viewed in FIG. 2, the diverging surface portions 151, 152 of the groove 150 are adapted to engage the inclined surface portions 153, 154, respectively, of the platen 25 on which the work is supported in order to suitably guide and support the platen 25 when the workpiece W carried thereby is engaged by the upper roller 12.

The uper roller 12 comprises a pair of roll segments 160, 161. These roll segments are adapted to be secured in the circumferentially extending roll receiving groove 120 in shaft 75 by retaining block means such as described above in connection with roll segments 140, 141. The groove 120 in shaft 75 extends around the enlarged portion 95 of the shaft 75, and the roll segments 160 and 161 when secured in position in the groove 120 provide a continuous roll having a continuous die groove 165 extending circumferentially therearound. The die groove 165 has a uniform width and a uniform depth and is rectangular in cross section. The width thereof may vary in accordance with the desired width of the bar formed thereby and is approximately equal to the largest thickness desired in the final product.

When the bar W is moved into the bite between rollers 12, 13, the topmost surface of the bar is received in groove 165 and drivingly engaged by roller 12 while the platen 25 is drivingly engaged by roller 13. These driving engagements cooperate to advance the carrier assembly 15 and bar W between the rolls 12, 13. As the bar moves between the rollers 12, 13 it is shaped thereby and the lower surface 34 thereof is forced into conformity with die surface 16 while the upper surface is formed by pressure engagement with roller 12, as aforementioned. This shaping of the bar lengthens it and reduces its thickness. The width of the bar is confined by the vertical edges of the die groove 165 and a smooth, uniform width is achieved on the bar by the confining vertical edges of die groove 165 and the outer peripheral surface of the roll 12 which engages the top surface of the platen 25, as shown in FIG. 2.

As the leading edge of the bar W moves beyond the bite of the rollers 12, 13, the stripper mechanism 20 engages the now formed bar and is operative to strip the bar away from the upper roller 12 out of the groove 165 therein and the bar continues to move with the platen 25 onto the exit or discharge conveyor 21. The stripper mechanism 20 comprises a suitable stripper blade 170 having a pointed edge 171 located adjacent the periphery of the upper roller 12 so that the bar as it moves between the rolls 12, 13 is engaged and stripped off of the roller 12 by the blade 170. Blade 170 is suitably supported by a support block 172 which in turn is supported by a support frame member 173. A roller 174 is suitably supported by the support block 172 and operatively engages the top surface portion of the bar to guide the bar therepast. The stripper blade 170 is secured in position in a conventional manner so that it is adjustable vertically to be operative with bars of different thickness.

As the carrier asembly 25 and bar move beyond the stripper mechanism 20 they are moved onto the delivery conveyor 21. The delivery conveyor 21 comprises a plurality of freely rotatable idler rollers 180 extending between frame members 181. Suitable aligning rollers 183 of conventional construction are spaced along the conveyor 21 for aligning and maintaining the platen 25 in alignment on the delivery conveyor 21. A suitable vertically adjustable support member 147 supports the left end of the delivery conveyor 21 as viewed in FIG. 1 while the right end thereof is supported by the roller assembly 11.

It should be apparent from the above description that the present invention provides a simple and efficient rolling method and apparatus for forming a tapered bar and the apparatus including the roll segments 140, 141 and 160, 161 may be readily set up in a minimum of time and the roll segments may be replaced easily depending upon the desired size of the tapered bar being formed. Moreover, since the rolls 12, 13 are associated and driven in a manner so that they will not slip relative to each other, relative longitudinal displacement between the bar and die surface is avoided and the rolls provide a smooth surface finish on the tapered bar. While the present invention has been described above as embodied in a leaf spring forming method and apparatus, it should be apparent and understood that it could be used to shape a variety of articles.

Moreover, while the preferred embodiment of the present invention has been described in considerable detail with reference to a specific use it is to be understood that the present invention is not correspondingly limited to the construction shown or the uses referred to and that modifications and changes in construction and uses may be made by one skilled in the art and coming within the scope of the appended claims.

Having described my invention, I claim:

1. An apparatus for shaping an article comprising an article carrier having a die surface for receiving the article thereon and corresponding to a desired contour for one surface of said article, a pair of roll shafts each having a circular cross section and a circumferentially extending roll receiving groove therein, first and second pressure rolls supported by said roll shafts respectively in said grooves and extending circumferentially of said roll shafts, each of said rolls including plural arcuate roll segments, and means for securing said roll segments forming said first and second rolls in position in said roll receiving grooves, said first roll having portions for drivingly engaging said carrier and said second roll having portions for drivingly engaging a surface of said article opposite said one surface, said driving engagements causing said carrier and article to be advanced between said rolls whereby said one surface of said article is shaped to the contour of said die surface.

2. An apparatus as defined in claim 1 wherein at least one of said circumferentially extending roll receiving grooves is defined by a pair of circumferentially extending side wall surfaces spaced an axial distance greater than the axial extent of the arcuate roll segments, one of said side wall surfaces being undercut, said arcuate roll segments having first portions positioned in said undercut of said one side wall thereby providing a first dovetail connection therebetween, and said means for receiving said roll segments in said at least one groove comprising block members positioned in said at least one groove and having an undercut portion, said arcuate roll segments having second projecting portions positioned in said undercut of said block members and providing a second dovetail connection therebetween.

3. An apparatus as defined in claim 1 wherein at least one of said roll shafts includes a main portion having a slot therein and a roll segment received in said slot and forming a circular cross section with said main portion, and said roll receiving groove therein being formed in part in said roll segment and in part in said main portion.

4. An apparatus as defined in claim 1 wherein a pair of spacer rings are secured to each of said shafts in encircling relation and spaced axially on opposite sides of said roll receiving groove, the spacer rings on one shaft having portions for engagement with portions of the spacer rings on the other shaft upon rotation of the shafts.

5. An apparatus for shaping an article comprising a pair of roll shafts, one of said roll shafts having a circumferentially extending roll receiving groove therein, first and second pressure rolls supported by said roll shafts, respectively, one of said pressure rolls comprising a plurality of arcuate roll segments positioned in said groove and extending circumferentially of said one roll shaft, said circumferentially extending roll receiving groove being defined by a pair of circumferentially side wall surfaces spaced an axial distance greater than the axial extent of the arcuate roll segments, one of said side wall surfaces being undercut, said arcuate roll segments having first portions positioned in said undercut of said one side wall thereby providing a first dovetail connection therebetween, and means for securing said roll segments in said at least one groove comprising block members positioned in said at least one groove and having an undercut portion cooperable with a second projecting portion positioned in said undercut of said block members and providing a second dovetail connection therebetween.

6. An apparatus for tapering bar stock comprising a bar stock carrier adapted to support a die means thereon, die means positioned on said carrier and having an upper tapered die surface adapted to form a tapered die surface of a contour corresponding to the desired contour for one surface of the bar stock and on which tapered die surface the bar stock is positioned while said bar stock carrier is stationary with its said one surface in engagement with said tapered die surface of said die means and by which the bar stock is entirely supported, a pair of rotatable pressure rolls supported adjacent each other and with their surfaces running in a closely spaced relation, means for directing said bar stock carrier with said bar stock supported entirely thereon linearly into the space between the surfaces of said rolls, one of said rolls having portions for frictionally drivingly engaging said carrier and the other of said rolls having portions for frictionally drivingly engaging a surface of said bar stock opposite said one surface, said driving engagements causing said carrier and article to be advanced linearly between said rolls and said one surface of said bar stock to be forced into the contour of said die surface, and means for driving said portions of said rolls at the same surface speed.

7. An apparatus for tapering bar stock comprising a bar stock carrier adapted to support a die means thereon, die means positioned on said carrier and having an upper tapered die surface adapted to form a tapered die surface of a contour corresponding to the desired contour for one surface of the bar stock and on which tapered die surface the bar stock is positioned while said bar stock carrier is stationary with its said one surface in engagement with said tapered die surface of said die means and by which the bar stock is entirely supported, a pair of rotatable pressure rolls supported adjacent each other and with their surfaces running in a closely spaced relation, means for directing said bar stock carrier with said bar stock supported entirely thereon linearly into the space between the surfaces of said rolls, one of said rolls having portions for frictionally drivingly engaging said carrier and the other of said rolls having portions for frictionally drivingly engaging a surface of said bar stock opposite said one surface, said driving engagements causing said carrier and article to be advanced linearly between said rolls and said one surface of said bar stock to be forced into the contour of said die surface, and means for driving said portions of said rolls at the same surface speed, and said bar stock carrier having a vertically extending stop means at the leading end thereof as the carrier is advanced between said pressure rolls and engageable with the leading end of the bar stock to inhibit relative movement of the bar stock rearward of the carrier.

8. An apparatus for tapering bar stock comprising a bar stock carrier having a die surface for receiving the bar stock thereon and corresponding to a desired contour for one surface of the bar stock, a pair of roll shafts each having a circular cross section and a circumferentially extending roll receiving groove therein, first and second pressure rolls supported by said roll shafts respectively in said grooves and extending circumferentially of said roll shafts, each of said rolls including plural arcuate roll segments, retaining block means positioned in said grooves and securing said roll segments therein, said first roll having portions for engaging said carrier opposite said die surface and said second roll having portions for engaging a surface of the bar stock opposite said one surface, and said bar stock carrier and bar stock being advanced between said rolls whereby said one surface of the article is forced into the contour of said die surface by the action of said rolls.

References Cited by the Examiner

UNITED STATES PATENTS

| | | | |
|---|---|---|---|
| 18,011 | 8/57 | Gaylord | 80—19 |
| 73,467 | 1/68 | Seely | 80—24 |
| 438,374 | 10/90 | Hirsch | 80—19 |
| 717,538 | 1/03 | Buhoup | 80—19 |
| 1,547,250 | 7/25 | Wilson | 80—19 |
| 1,661,267 | 3/28 | Repp | 80—19 |
| 1,921,486 | 8/33 | Seiferth | 80—19 |
| 1,999,140 | 2/35 | Seiferth | 80—19 |

FOREIGN PATENTS

| | | |
|---|---|---|
| 368,725 | 2/23 | Germany. |
| 563,685 | 10/32 | Germany. |
| 258,062 | 5/49 | Switzerland. |

CHARLES W. LANHAM, *Primary Examiner.*